E. K. BLESSING.
VALVE FOR WIND INSTRUMENTS.
APPLICATION FILED MAR. 25, 1909.

963,272.

Patented July 5, 1910.

Attest:
Ewd R. Tolson
Edward N. Sarton

Inventor:
Emil K. Blessing,
By Spear, Middleton, Donaldson & Spear
Atty's.

UNITED STATES PATENT OFFICE.

EMIL K. BLESSING, OF ELKHART, INDIANA.

VALVE FOR WIND INSTRUMENTS.

963,272.  Specification of Letters Patent.  Patented July 5, 1910.

Application filed March 25, 1909. Serial No. 485,738.

*To all whom it may concern:*

Be it known that I, EMIL K. BLESSING, citizen of the United States, residing at Elkhart, Indiana, have invented certain new and useful Improvements in Valves for Wind Instruments, of which the following is a specification.

My invention relates to musical instruments of the wind type, and particularly to an improvement in the valve.

Figure 1:
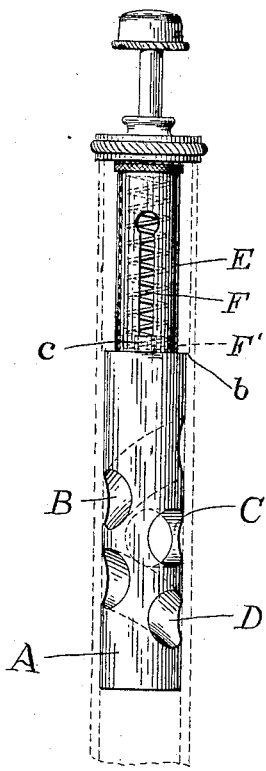
Figure 2:
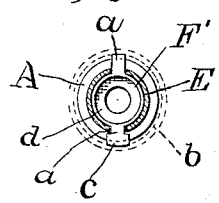
Figure 3:
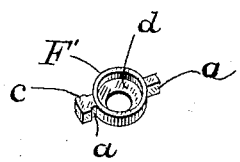

In the accompanying drawing, Figure 1 represents a side elevation of a valve or piston. Fig. 2 is a section taken horizontally of the same, and Fig. 3 is a view of a detail.

The piston containing the usual ports is shown at A, and the ports at B, C, D, and are of any ordinary or improved construction.

The hollow stem E is adapted to receive a coiled spring F, this spring bearing at its lower end upon what is known technically in this art as a star F'. This consists of a disk of metal having two or more projections $a$, extending from the periphery, and having a depression in its upper face to form a seat for the spring, as shown at $d$, and an opening passing through the center of the disk. The projections $a$ of the disk travel in slots made in the wall of the stem, and project beyond the periphery thereof; the coil spring pressing upon said star serves to return the piston after the depression thereof through the ordinary keys. The pistons, as is well known, are held within casings as shown in dotted lines in Fig. 1, and the projections $a$ engage a shoulder $b$ formed on the interior of the casing by an enlargement of the diameter thereof. The experience has been in the use of these stars, whether having 2, 3 or more projections, that they upset in the hollow stem E, and will also stick in the vertical movement of the piston, it being found that if the stars tilt slightly the edges of the projections come in contact with the shoulder $b$, and if this occurs it becomes necessary to take the piston out and restore the star to its proper position, which of course seriously interferes with the efficiency of the instrument, and for the time being prevents its use. I have aimed, not only to overcome this, but also to provide for the ready removal of the star in case for any reason it is found desirable to take it out either for repair or replacement. I prevent the upsetting and sticking of the star by contact with the shoulder $b$, by simply making the projection of a headed form, as shown at $c$, the extensions of the head coming in contact with the wall of the stem bordering the slot so as to prevent the tilting of the star to such an extent as would permit the lower edge of either projection $a$ to engage with the shoulder $b$ and thus allow the star to remain permanently in its upset and tilted position. In other words, the movement of the star is so limited as to prevent it from catching, upsetting and remaining in a tilted or abnormal position.

In order to readily remove the star in case it is desirable to replace it with a new one, I simply enlarge the slots in the stem at their upper end so that it is only necessary to slide the stars to the upper end of the slots and give them a quarter turn, which will enable the star to be removed through the enlargement of the slots.

By my improved construction I secure a very light and quick action of the piston, and there is utterly lacking the objectionable friction of the old construction at present in use.

What I claim is:

A wind instrument comprising a casing, a piston in said casing, a hollow stem for the piston having a longitudinal slot therein having an enlarged upper end, a star in said stem having a central depression and having a projection extending through the slot, said projection having side extensions extending beyond the walls of the slot and having the outer surface of the head formed by said projection and extensions curved to conform to the inner surface of the casing, and a spring within the hollow stem having its lower end seated in the depression.

In testimony whereof, I affix my signature in presence of two witnesses.

EMIL K. BLESSING.

Witnesses:
  BESSIE MOUNTJOY,
  LOUISE ROSWELL.